United States Patent [19]
Shibata

[11] Patent Number: 6,159,072
[45] Date of Patent: Dec. 12, 2000

[54] LENS TRANSPORT APPARATUS, A CUP FOR SECURING AN EYEGLASS LENS DURING TRANSPORT, AND A METHOD OF TRANSPORTING LENSES

[75] Inventor: Ryoji Shibata, Toyokawa, Japan

[73] Assignee: Nidek Co., Ltd., Aichi, Japan

[21] Appl. No.: 08/961,943

[22] Filed: Oct. 31, 1997

[30] Foreign Application Priority Data

Oct. 31, 1996 [JP] Japan ................................ 8-307184

[51] Int. Cl.$^7$ ................................................ B24B 49/00
[52] U.S. Cl. ................................ 451/6; 451/381; 451/390
[58] Field of Search .................................. 451/381, 390, 451/6

[56] References Cited

U.S. PATENT DOCUMENTS 4,118,898 10/1978 Godot .
5,546,140 8/1996 Underwood .......................... 351/47

FOREIGN PATENT DOCUMENTS

| 2 327 030 | 10/1975 | France . |
| 42 14 427 | 11/1993 | Germany . |
| 122876 | 9/1989 | Japan . |
| 651255 | 7/1994 | Japan . |
| 737809 | 8/1995 | Japan . |
| 818234 | 2/1996 | Japan . |
| 8252754 | 10/1996 | Japan . |
| 9225798 | 9/1997 | Japan . |
| 9225828 | 9/1997 | Japan . |

*Primary Examiner*—M. Rachuba
*Attorney, Agent, or Firm*—Sughrue, Mion, Zinn, Macpeak & Seas, PLLC

[57] ABSTRACT

An eyeglass lens securing cup (1) securely mounted on an eyeglass lens has a positioning portion which engages a manipulator to determine a specified axial position and it is placed in position on a tray (400). The tray (400) is moved to a specified position by a tray transport apparatus (500). A lens transport apparatus (300) has the manipulator which, in correspondence with the positioning portion of the securing cup (1), maintains the specified axial position, picks up the securing cup (1) from the tray (400) and transports it to a machining shaft on a grinder (200). The eyeglass lens having refractive power can be transported while allowing the optical center of the lens and its axial angle to keep the desired relationships.

12 Claims, 7 Drawing Sheets

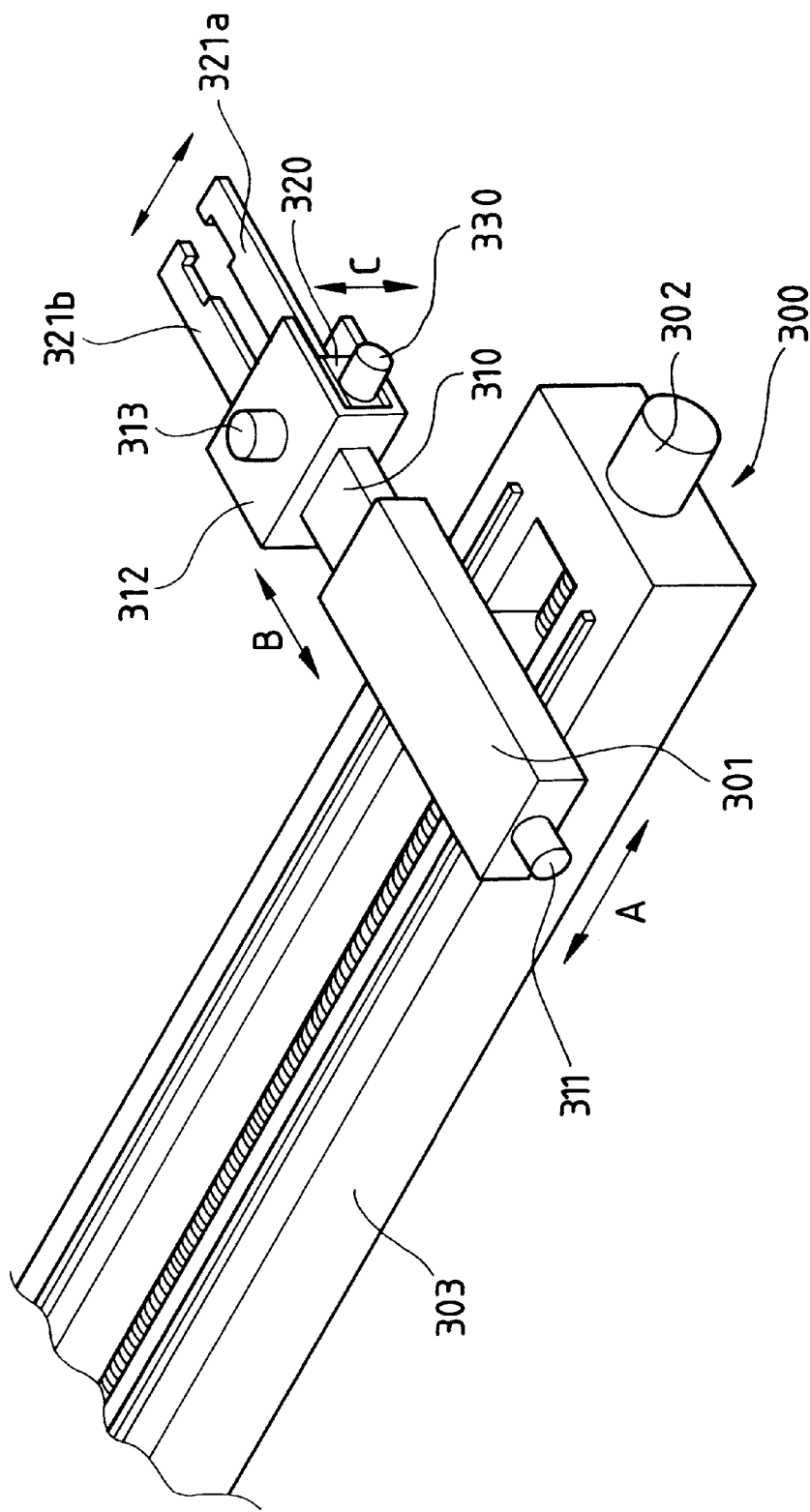

LENS TRANSPORT APPARATUS, A CUP FOR SECURING AN EYEGLASS LENS DURING TRANSPORT, AND A METHOD OF TRANSPORTING LENSES

BACKGROUND OF THE INVENTION

The present invention relates to an eyeglass lens securing cup for setting an eyeglass lens as a workpiece on a lens grinding machine. The invention also relates to a lens transport apparatus and method for transporting the eyeglass lens to which said cup is attached.

Machining of the periphery of an eyeglass lens with a grinder generally includes holding a workpiece lens (a lens to be machined) between two rotating shafts and machining the periphery of the lens with a grinding wheel while revolving the lens. In order to hold the lens between the rotating shafts, a securing cup is mounted on a lens surface and set on a cup holder connected to one rotating shaft. The securing cup to be mounted on a lens surface is available either as a type having a flared sucking portion or as a type which is mounted on a lens surface via a double-side adhesive pad.

In the machining of the periphery of eyeglass lens having refractive power, the lens to be machined is typically mounted on a securing cup such that its optical center and the axis of astigmatism are oriented in specified directions and the cup is then set on a cup holder in the grinder. In another method, the securing cup is mounted in a position corresponding to the geometric center of an eyeglass frame. Either method allows the lens to be machined while keeping a controlled relationship between the center of lens revolution and its optical center.

Machining of the periphery of eyeglass lens has conventionally been performed by an optician using an in-house grinder so that the lens is fitted in the eyeglass frame to be offered to a customer. Recently, with the efforts on the side of opticians toward rationalization of their business operations and the advances in communication technology, it is becoming increasingly popular to process a number of lenses in a large machining center at the request of many opticians.

Even in such centralized operations, the existing machining centers rely upon individual operators to set lenses on grinders, thus requiring much labor and time in lens transport and mounting procedures. Certain kinds of lenses (e.g., dummy lenses and sunglasses) are machined as they are secured by surface suction for automatic transport. However, this approach of transport is not suitable for the eyeglass lens having refractive power because of the need to take its optical center and axial angle into account and due to the variability of lens geometry.

SUMMARY OF THE INVENTION

The present invention has been accomplished under these circumstances and has as an object providing a lens transport apparatus which is capable of transporting an eyeglass lens having refractive power while allowing the optical center of the lens and its axial angle to keep the desired relationships.

Another object of the invention is to provide an eyeglass lens securing cup which is capable of transporting an eyeglass lens having refractive power while keeping the desired relationship between the optical center of the lens and its axial angle.

Yet another object of the invention is to provide a lens transport method which is capable of transporting eyeglass lenses of variable geometry.

The stated objects of the invention can be attained by the following.

(1) A lens transport apparatus comprising an eyeglass lens securing cup which has a positioning section in engagement with a manipulator to determine a specified axial positioning direction and which is for setting an eyeglass lens as a workpiece on a lens grinder, a lens placement table for allowing said eyeglass lens securing cup to be placed in said specified axial positioning direction, the manipulator which maintains said specified axial direction in correspondence with the positioning section of said eyeglass lens securing cup, first moving means for moving said manipulator and said lens placement table relative to each other such that said manipulator is moved to a position where said eyeglass lens securing cup is picked up, and second moving means for picking up said eyeglass lens securing cup from the lens placement table by means of the manipulator and transferring it to a machining shaft on said grinder.

(2) The lens transport apparatus of (1), wherein said lens placement table has securing portions for securing the basal portions of cups for securing a pair of eyeglass lenses.

(3) The lens transport apparatus of (2), wherein the securing portions of said lens placement table have portions into which the corresponding portions formed in said eyeglass lens securing cups can be fitted.

(4) The lens transport apparatus of (1), wherein said lens placement table is provided with a mark for identifying the eyeglass lens to be placed on said table.

(5) The lens transport apparatus of (1), wherein said lens placement table is provided with a mark for identifying the eyeglass lens to be placed on said table and wherein the mark data read by reading means is sent to said grinder.

(6) An eyeglass lens securing cup for setting an eyeglass lens as a workpiece on a lens grinder, which has engaging means for engaging a manipulator to determine a specified axial positioning direction.

(7) The eyeglass lens securing cup of (6), wherein said engaging means comprises either projections or dents.

(8) A lens transport method for transporting a lens as a workpiece to a lens grinder, comprising the steps of:

securing the lens to an eyeglass lens securing cup;

providing data which identifies the lens;

placing the lens on a placement table as it is secured to the eyeglass lens securing cup;

moving said placement table relative to a manipulator such that it is moved to a pickup position;

reading the lens identifying data and sending it to the grinder; and picking the secured lens by the manipulator and moving it to a machining shaft on the grinder.

BRIEF DESCRIPTION OF THE DRAWINGS

In the accompanying drawings:

FIG. 6 is an illustration of the details of the lens transport apparatus;

DETAILED DESCRIPTION OF THE PREFERRED EMBODIMENT

Figure 1:
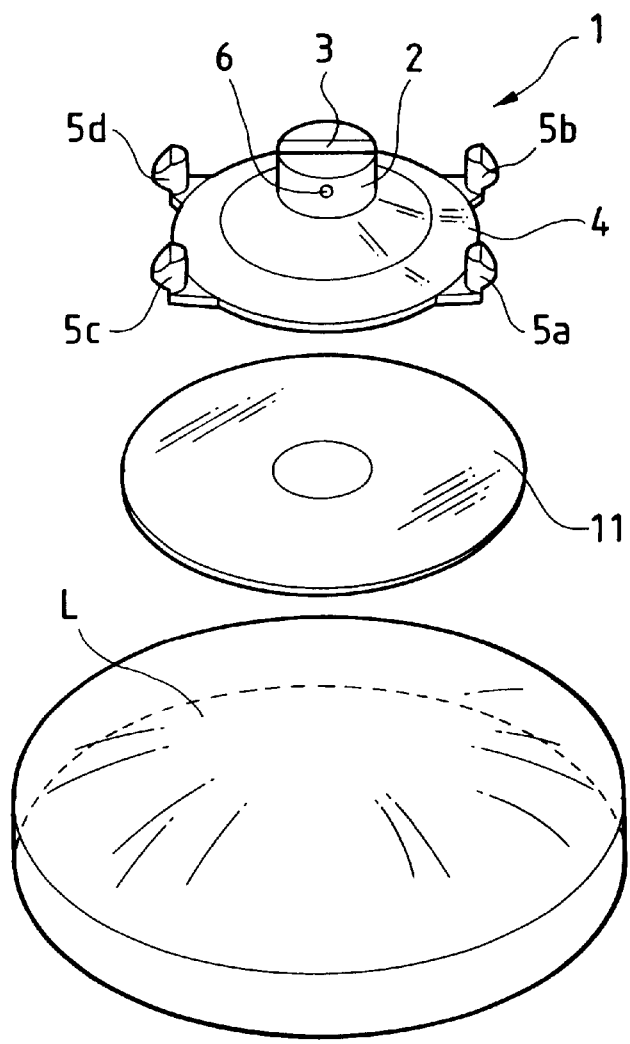
FIG. 1 is an illustration of a securing cup.
Figure 2:
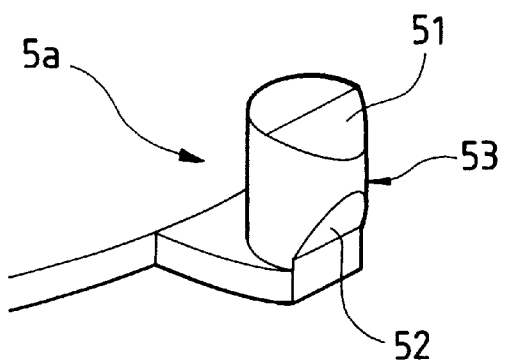
FIG. 2 shows details of the pins on the securing cup.

An embodiment of the invention will now be described with reference to the accompanying drawings. FIG. 1 shows an example of the securing cup of the invention. As shown, the securing cup generally indicated by 1 comprises a cylindrical basal portion 2 which is to be set on a cup holder connected to a lens rotating shaft in a grinder, a key slot 3 formed in the basal portion 2, a cup portion 4 with a flared skirt and four pins 5a to 5d projecting form the edge of the cup portion 4. The lateral side of the basal portion 2 is provided with a positioning mark hole 6 serving as a guide for determining the vertical attitude of a workpiece lens L (the term "vertical" as used herein is referenced to the vertical attitude of the lens being worn by a user). The bottom surface of the cup portion 4 is curved and concaved such that it can abut against the front surface of the workpiece lens L via a double-side adhesive pad 11. The four pins 5a to 5d are slightly smaller in height than the cup portion 4 and provided in such a way as to maintain a specified positional relationship with the longitudinal direction of the key slot 3. As shown enlarged in FIG. 2, the pin 5a is shaped to have tapered faces 51 and 52 that are formed by cutting off the right half of a cylinder, one from the top downward and the other from the bottom upward, such that a projection 53 is formed on the side right to the key slot 3 shown in FIG. 1. Similarly, the pin 5b is shaped to have a projection 53 on the right side. On the other hand, the pins 5c and 5d are shaped to have projections 53 formed on the left side, being symmetric with the projections of the pins 5a and 5b, respectively. The thus shaped pins 5a to 5d are provided in such areas of the cup portion 4 that they do not interfere with the cup holder on the grinder (to be described just below) when the basal portion 2 is set on the cup holder.

Being constructed in the manner described above, the securing cup 1 is made of a mixture of polycarbonate and glass fibers by well-known molding processes and has a higher strength against tension and torsion than rubber cups.

Figure 3:
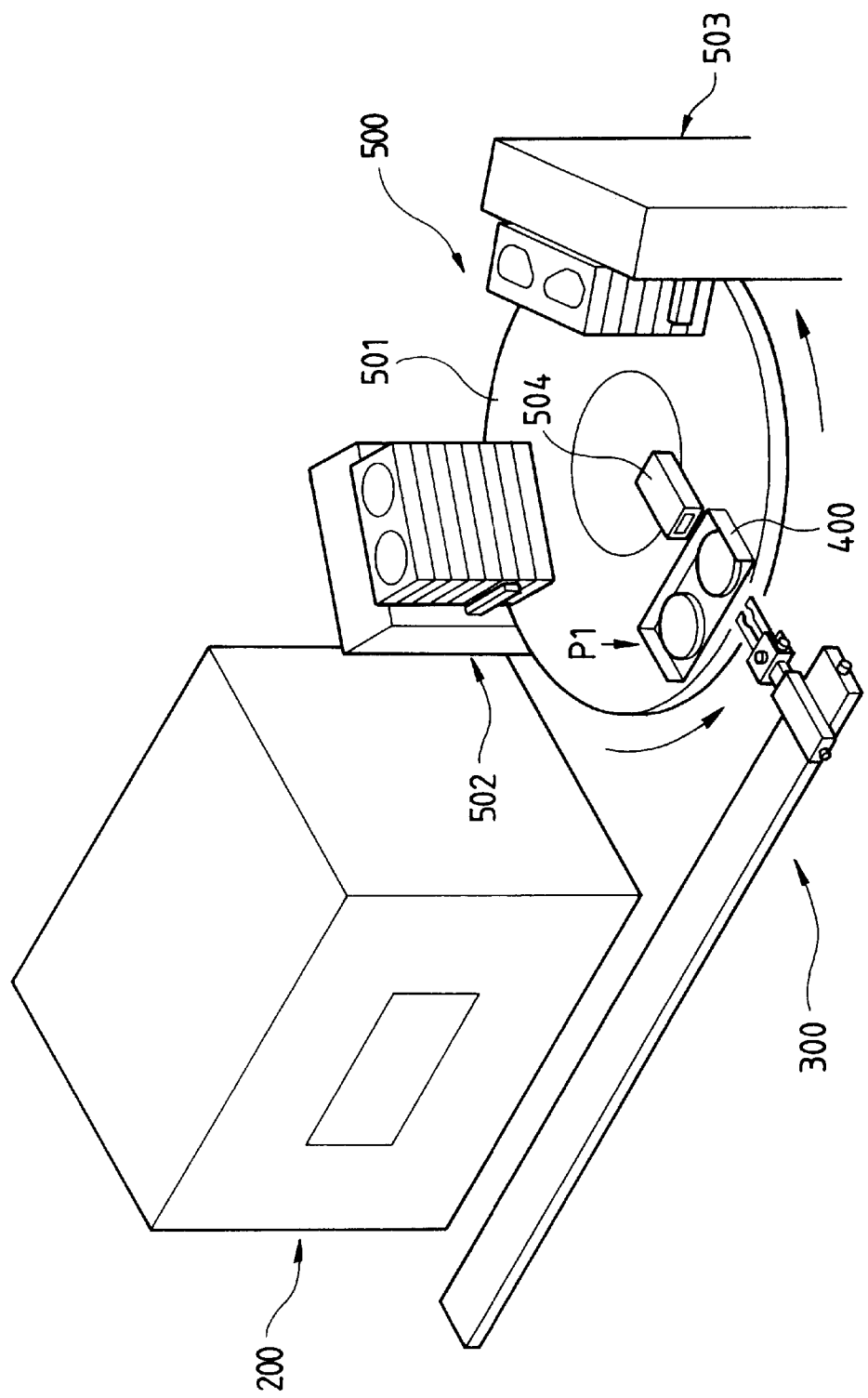
FIG. 3 is a perspective view showing the general layout of a lens grinder, a lens transport apparatus and a tray transport apparatus.

FIG. 3 is a perspective view showing the general layout of a grinder for machining the periphery of the general eyeglass lens and a lens transport apparatus with which a workpiece lens mounted on the securing cup 1 is transported to the grinder. Numeral 200 designates the grinder, 300 the lens transport apparatus, and 400 a lens transport tray on which workpiece lenses are placed for transport. Numeral 500 designates a tray transport apparatus which transports the tray 400 to a specified position where a lens is transferred to and from the lens transport apparatus 300.

Figure 4:
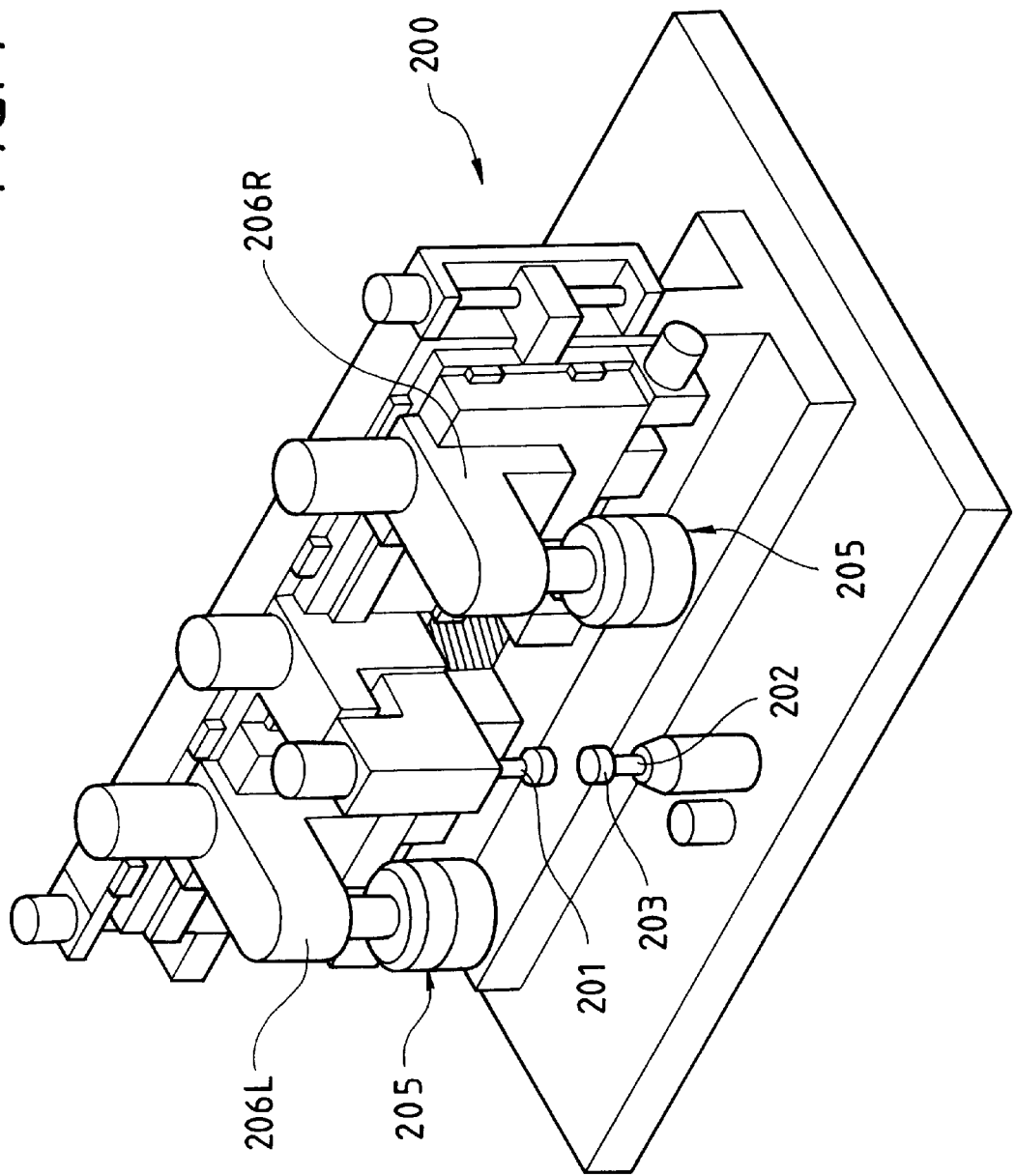
FIG. 4 is an illustration of the details of the lens grinder.
Figure 5:
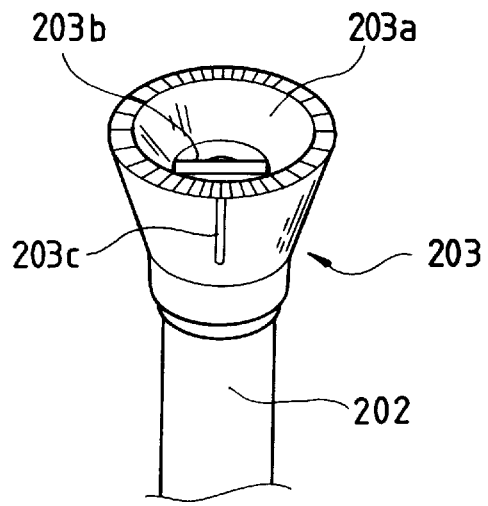
FIG. 5 is an illustration of the cup holder in the grinder.

The construction of the grinder 200 will be described with reference to FIG. 4. As shown, the grinder 200 holds the workpiece lens between a downwardly extending upper rotating shaft 201 and an upwardly extending lower rotating shaft 202. The lens is set on a cup holder 203 connected to the lower rotating shaft 202, with the securing cup 1 facing down. As shown enlarged in FIG. 5, the cup holder 203 has a receptacle (receiving portion) 203a into which the basal portion 2 and cup portion 4 of the securing cup 1 can be fitted, and a key 203b that fits into the key slot 3 on the securing cup 1 is formed on the bottom of the receptacle (receiving portion) 203a. The cup holder 203 is connected to the lower rotating shaft 202 such that the key 203b extends both right and left with respect to the grinder 200 both at the start of the grinding operation and at the end of it. Numeral 203c designates a mark for indicating the vertical direction of a lens, and the lens can be aligned in the vertical direction by setting the securing cup 1 in such a way that the mark 203c corresponds to the mark hole 6.

The lens held between the upper rotating shaft 201 and the lower rotating shaft 202 is machined from two directions by means of a right lens grinding portion 206R and a left lens grinding portion 206L, each having a plurality of grinding wheels 205 on the rotating shaft. With the lens and the grinding wheels 205 being revolved, the grinding operation is performed by moving the lens grinding portions 206R and 206L to either right or left mutually with respect to the upper rotating shaft 201 (hence, the lower rotating shaft 202); in a finishing operation, the lens grinding portions 206R and 206L are also moved vertically. The movement of the lens grinding portions 206R and 206L is controlled by the control section of the grinder 200 on the basis of lens machining data preliminary inputted. For details of the grinder 200, reference should be made on U.S. application Ser. No. 08/679,482.

Next, the lens transport apparatus 300 will be described with reference to FIG. 6. Numeral 301 designates a slider capable of moving to laterally; 303 is a base extending between the grinder 200 and the lens transport tray 400 placed in a specified position, and the slider 301 is driven by a motor 302 to move laterally (in the direction of arrow A) on the base 303; 310 is an arm capable of moving back and forth and it is driven by a motor 311 to move back and forth (in the direction of arrow B) with respect to the slider 301. Fitted at the distal end of the arm 310 is a clamp portion 320 which is connected via a generally U-shaped mounting member 312 and which is capable of moving vertically (in the direction of arrow C). The clamp portion 320 is driven by a motor 313 to move vertically and the motor 313 is securely provided on the mounting member 312. The clamp portion 320 has two clamp fingers 321a and 321b which can be opened or closed to hold the securing cup 1; the clamp fingers 321a and 321b are driven with a motor 330 to open or close.

Figure 7A:
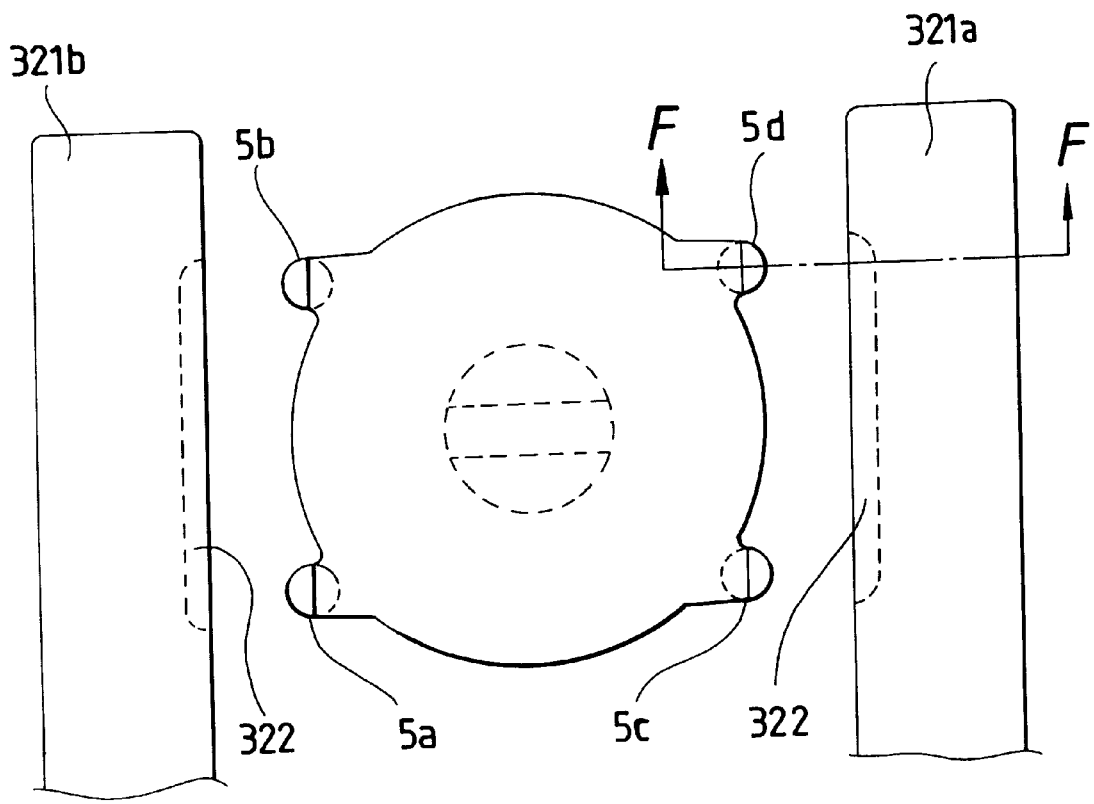
FIGS. 7(a) and 7(b) show the positional relationship between the shape of clamp figures in the lens transport apparatus and the pins on the securing cup.
Figure 7B:
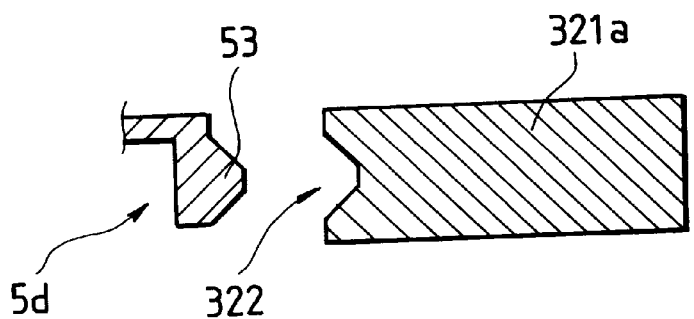

As shown in FIG. 7, the clamp finger 321a has a dent 322 formed on the inner surface of the front portion by which it holds the securing cup 1; FIG. 7a shows the clamp finger 321a as seen from above, with the securing cup 1 facing down as it securely holds the lens and FIG. 7b is a section F—F of FIG. 7a. The dent 322 has a length sufficient to cover the distance between the pins 5c and 5d on the securing cup 1 and it is generally V-shaped to conform to the shape of the projection 53 of the pin 5d (or 5c). A similar dent 322 is formed on the clamp finger 321b. Having this construction, the clamp fingers 321a and 321b are capable of holding the securing cup 1 with both dents 322 being in engagement with the pins 5a to 5d and, hence, with the key slot 3 maintaining its proper direction.

Figure 8:
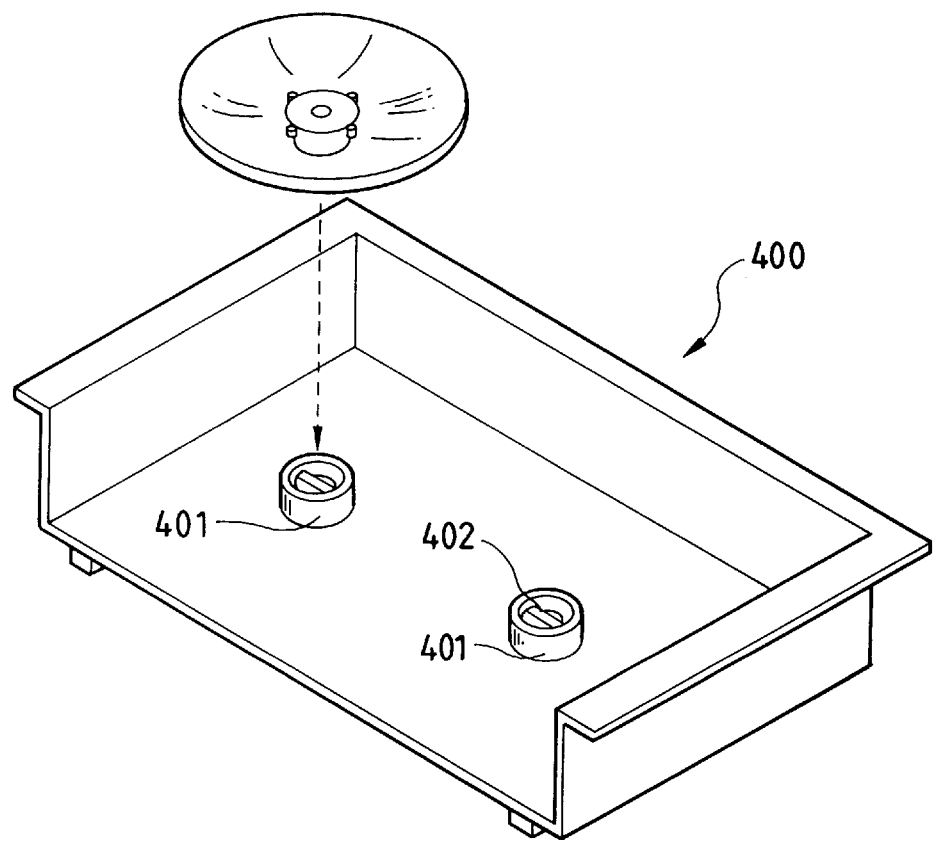
FIG. 8 is an illustration of the lens transport tray.

Next, the lens transport tray 400 will be described. As shown in FIG. 8, the bottom of the tray 400 is provided with two positioning receptacles (receiving portions) 401 each for setting the basal portion 2 of the securing cup 1 such that a pair of right and left eyeglass lenses can be set in the tray 400. On the bottom of each receptacle (receiving portion) 401, an angle correcting key 402 (similar to the key 203b on the cup holder 203) is formed in such a way that it engages with the key slot 3.

The tray transport apparatus 500 shown in FIG. 3 will now be described more specifically. This apparatus comprises a turntable 501 on which the tray 400 is placed for rotation, a robot 502 for lifting the tray 400 containing yet to be machined lenses, and a robot 503 for lifting the tray 400 containing machined lenses. As the turntable 501 rotates, the trays 400 placed in front of the robot 502 are transported in succession to a specified position at point P1, where the lens is transferred to and from the lens transport apparatus 300. In addition, a bar code reader 504 is provided above the turntable 501 in an invariable position (i.e. a fixed position) such that the bar code marked on the back side of the tray 400 to identify the lens specifications can be read as the tray 400 moves rotationally.

Figure 9:
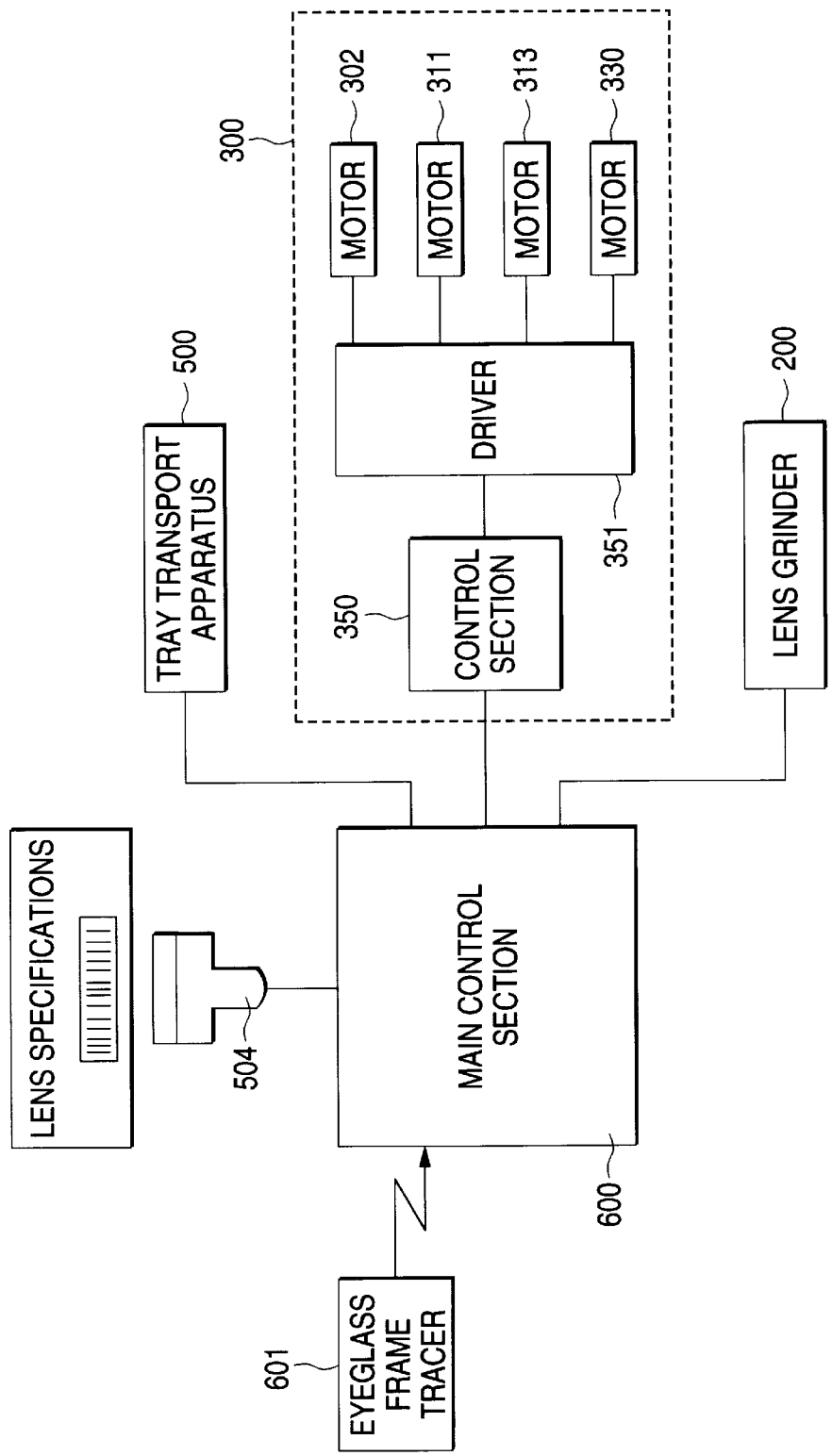
FIG. 9 is a block diagram for the control of the overall system.

The operation of various parts of the system, particularly the lens transport apparatus 300, will be described with reference to FIG. 9 which is a block diagram for the control of the overall system. First, pursuant to the lens specifications ordered by an optician, the operator mounts the securing cup 1 to the front side of a lens, which matches with the specifications, by means of the double-side adhesive pad 11. Using a well-known method (i.e., by means of an axial alignment device), the operator mounts the securing cup 1 in such a way that the optical center of the lens and its axial angle satisfy specified positional relationships with the key slot 3 and that the mark hole 6 is positioned vertically upward.

After the securing cup 1 has been mounted on the lens, the operator sets it on the receptacle (receiving portion) 401 on the transport tray 400, with the securing cup 1 facing down. Be sure to set the lens by fitting the key 402 into the key slot 3 such that the mark hole 6 will face the front of the tray 400. This procedure allows the lens to be placed on the tray 400 in a specified state (both the optical center and axial angel of the lens satisfying the specified positional relationships). The same procedure is repeated to set a pair of lenses on each tray 400 and a number of trays 400 having lenses set properly are provided to be ready for transport by the tray transport apparatus 500. Each tray 400 is marked with a bar code identifying the specifications of the lenses carried on it. Alternatively, respective bar codes may be applied to trays 400 so as to distinguish one of trays from the others, and the data for the specifications of the lenses placed on each tray 400 are inputted in relation to the bar code so as to achieve correct identification of the tray 400 and the lenses carried thereon.

After thusly setting the lenses in a "ready" position, the operator starts to transport them automatically. A main control section 600 performs communication of command signals and data with various parts of the system in response to a START signal. First, the main control section 600 issues a drive instruction to the tray transport apparatus 500 for driving it. The tray transport apparatus 500 transports the tray 400 to the specified position where the lens is transferred to and from the lens transport apparatus 300. At the same time, the bar code reader 504 in the tray transport apparatus 500 reads the bar code marked on the back side of the tray 400 for identifying the lens specifications and supplies the main control section 600 with the data on the lens that has reached the specified position where it is to be transferred to and from the lens transport apparatus 300. The main control section 600 checks those data with the data on the contour of eyeglass frame which has been separately sent from an optician and sends both kinds of data to the grinder 200.

When the tray 400 has reached the specified position for lens transfer, the main control section 600 activates the lens transport apparatus 300. The control section 350 of the lens transport apparatus 300 causes a driver 351 to drive the respective motors so that the lens is transported to the grinder 200 in the following manner. The arm 310 is advanced to a specified position so that the clamp fingers 321a and 321b are inserted under one of the two lenses;

thereafter, the clamp fingers 321a and 321b are closed to hold the pins 5a to 5d of the securing cup 1. As already mentioned, the pins 5a to 5d engage the dents 322 on the clamp fingers 321a and 321b and, hence, are capable of holding the securing cup 1 while maintaining the correct positional relationship with the key slot 3. After holding the securing cup 1, the clamp portion 320 is lifted by means of the motor 313 so that the cup 1 is pulled out of the receptacle 401. With the cup 1 maintained at a specified height, the arm 310 is contracted and the slider 301 is moved along the base 303 until the lens is transported to a specified position in front of the grinder 200. Subsequently, the arm 310 is extended and the cup 1 is positioned above the cup holder 203 and the clamp portion 320 is lowered to set the cup 1 on the cup holder 203. Since the key 203b on the cup holder 203 is oriented in a predetermined direction at both the start and the end of machining operations, it fits into the key slot 3. When the securing cup 1 is set in position, the clamp fingers 321a and 321b are opened and the arm 310 is moved backward away from the grinder 200.

In the next step, the main control section 600 starts machining with the grinder 200. On the basis of the input data on the contour of eyeglass frame, the grinder 200 rotates the lens and grinding wheels 205 and controls the drive of the lens grinding portions 206R and 206L such that the lens set on the cup holder 203 is ground to a predetermined shape. After the machining operation ends, an END signal is sent to the main control section 600.

In response to the END signal, the main control section 600 reactivates the lens transport apparatus 300. The clamp fingers 321a and 321b are advanced and, after holding the securing cup 1 at the pins 5a to 5d, the clamp portion 320 is raised, whereby the securing cup 1 is pulled out of the cup holder 203. Thereafter, the same procedure as performed for setting the cup 1 is repeated but this time in reverse order, whereby the machined lens is transported to a position just above the tray 400 and placed on it.

When the machining of one lens ends, the other lens is similarly transported and machined. When both lenses have been machined and returned to the tray 400, the main control section 600 activates the tray transport apparatus 500 such that the next tray 400 carrying yet to be machined lenses is set in a specified transport position. Subsequently, lens transport and machining are repeated in the same manner just described above.

As will be apparent from the foregoing description, the lens transport apparatus 300 holds the securing cup 1 which has been securely mounted on the lens and, hence, the eyeglass lens can be transported in a non-contact and yet positive manner independently of not only shape and type of an lens before being machined but also the shape of the lens after being machined.

In addition, since the securing cup 1 is designed so that the specified portion thereof is held, the lens can be transported to and set on the grinder with the optical center and axial angle maintaining the intended positional relationship.

As already mentioned, the portions of the securing cup 1 by which the securing cup 1 is to be held by the lens transport apparatus 300 should be provided in such areas that they do not interfere with the cup holder, and as long as this requirement is met, the pins 5a to 5d in the form of projections may be replaced with ones in the form of dents formed in the periphery of the cup portion 4. In this alternative case, the holding side of each of the clamp fingers 321a and 321b on the lens transport apparatus 300 should be so shaped as to engage the dents. In addition, the number of the pins or dents is by no means limited to the illustrated case and may be adjusted properly.

If desired, the edge thickness of the cup portion 4 may be sufficiently increased so that the edge can be held by the lens transport apparatus 300. In this case, the lens to be machined may also be placed in a specified transport position as in the illustrated case, whereby the lens can be transported for setting on the grinder while maintaining its axial angle.

While the present invention has been described above with reference to a cup for securing an eyeglass lens during the machining of its periphery, it should be understood that the invention is also applicable to a cup for securing the lens during other machining operations such as the grinding of its rear surface.

As described on the foregoing pages, the eyeglass lens securing cup of the invention and the lens transport apparatus for transporting the eyeglass lens have the advantage that even eyeglass lens having optical center and axial angle can be transported and set on a grinder while maintaining the specified positional relationship.

According to the lens transport method of the invention, eyeglass lenses of various shapes can be transported easily.

What is claimed is:

1. A lens transport apparatus for supplying an eyeglass lens to a lens-grinding machine to perform an edging operation on the eyeglass lens; said lens-grinding machine including processing shafts for holding the eyeglass lens therebetween, a cup holder provided on one of the processing shafts and a protruded first key formed on the cup holder; said transport apparatus comprising:

an eyeglass lens securing cup for mounting the eyeglass lens, said eyeglass lens securing cup having a key groove adapted to be fitted on the protruded first key, and said eyeglass lens securing cup further having a plurality of projections to be fitted into dents of clamping fingers of a clamp portion to guide said key groove to a predetermined position with respect to the clamp portion when said eyeglass lens securing cup is held by said clamp portion;

a tray having a support portion for supporting said eyeglass lens securing cup, said support portion having a second key adapted to be fitted in said key groove of said cup;

moving means for three dimensionally moving said clamp portion holding said eyeglass lens securing cup;

control means for controlling said moving means to pick up said eyeglass lens securing cup supported on said support portion of said tray located at a second predetermined position, transport said eyeglass lens securing cup to said lens grinding machine, and mount said eyeglass lens securing cup to the cup holder.

2. The lens transport apparatus according to claim 1, wherein said support portion of said tray supports a pair of said eyeglass lens securing cups mounting a pair of right and left eyeglass lenses, respectively.

3. The lens transport apparatus according to claim 1, wherein said tray has a mark thereon which identifies a specification of the eyeglass lens.

4. The lens transport apparatus according to claim 3, further comprising:

means for reading data from said mark and sending the thus read data to said lens-grinding machine.

5. A tray used for a lens transport apparatus, the lens transport apparatus supplying an eyeglass lens to a lens-grinding machine to perform an edging operation on the eyeglass lens, said tray comprising:

an eyeglass lens securing cup on which an eyeglass lens is mounted;

a support portion for supporting said eyeglass lens securing cup on which said eyeglass lens is mounted; and a key adapted to be fitted to a key groove of said eyeglass lens securing cup to position said securing cup in a predetermined orientation with respect to said tray, said key provided on a bottom of said support portion; and wherein said key groove of said eyeglass lens securing cup defines a predetermined specified positional relationship of said eyeglass lens with respect to said eyeglass lens securing cup.

6. A tray according to claim 5, wherein said support portion supports a pair of eyeglass lens securing cups mounting a pair of right and left eyeglass lenses, respectively.

7. A lens transport apparatus according to claim 1, further comprising:

a tray transporting device for picking up one from a plurality of trays in which eyeglass lenses to be processed are accommodated, and moving said one tray to said second predetermined position.

8. A lens transport apparatus according to claim 1, further comprising:

a tray transporting device for moving said tray, after a lens processed by the lens-grinding machine has been placed in said tray, to a storage space other than the second predetermined position.

9. A lens transport apparatus for supplying an eyeglass lens to a lens-grinding machine to perform an edging operation on the eyeglass lens; said lens-grinding machine including processing shafts for holding said eyeglass lens therebetween, a cup holder provided on one of the processing shafts, and a first key formed on the cup holder; said transport apparatus comprising:

an eyeglass lens securing cup for mounting said eyeglass lens, said eyeglass lens securing cup having a mating key adapted to be mated with said first key so as to fix a predetermined orientation of said eyeglass lens securing cup with respect to the cup holder, said eyeglass lens securing cup further having a coupling portion;

a clamp portion adapted to clamp said eyeglass lens securing cup by said coupling portion, wherein said coupling portion of said eyeglass lens securing cup guides said mating key to a predetermined position with respect to the clamp portion when said eyeglass lens securing cup is clamped by said clamp portion;

a tray having a support portion for supporting said eyeglass lens securing cup, said support portion having a second key adapted to be mated with said mating key of said eyeglass lens securing cup so as to fix a predetermined orientation of said eyeglass lens securing cup with respect to said tray;

a transport device which three dimensionally moves said clamp portion holding said eyeglass lens securing cup;

a controller which controls said transport device to pick up said eyeglass lens securing cup supported on said support portion of said tray located, transport said eyeglass lens securing cup to said lens grinding machine, and mount said eyeglass lens securing cup to the cup holder of the eyeglass lens-grinding machine.

10. The lens transport apparatus according to claim 9, wherein said support portion of said tray supports a pair of said eyeglass lens securing cups mounting a pair of right and left eyeglass lenses, respectively.

11. The lens transport apparatus according to claim 9, wherein said tray has a mark thereon which identifies a specification of the eyeglass lens.

12. The lens transport apparatus according to claim 9, further comprising:

a reader which reads data from said mark and sends the thus read data to said lens-grinding machine.

* * * * *